L. WHEELER.
ATTACHMENT FOR PLANTING MACHINES.
APPLICATION FILED FEB. 21, 1911.
1,023,346.
Patented Apr. 16, 1912.
2 SHEETS—SHEET 2.
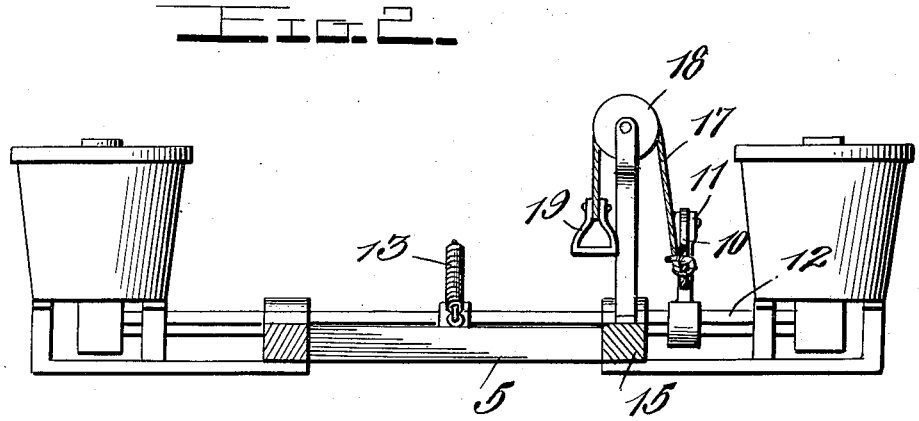
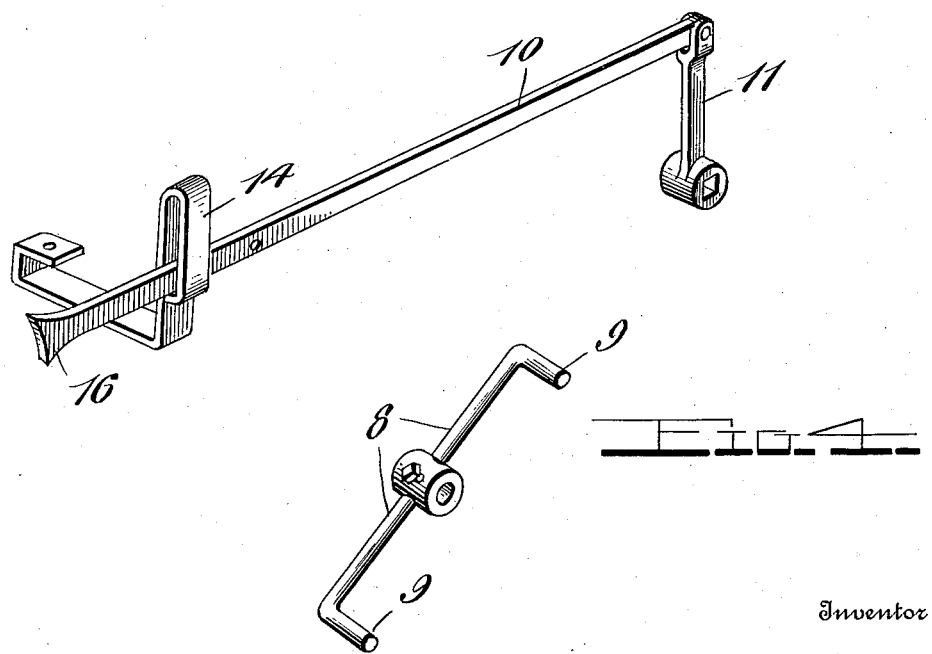

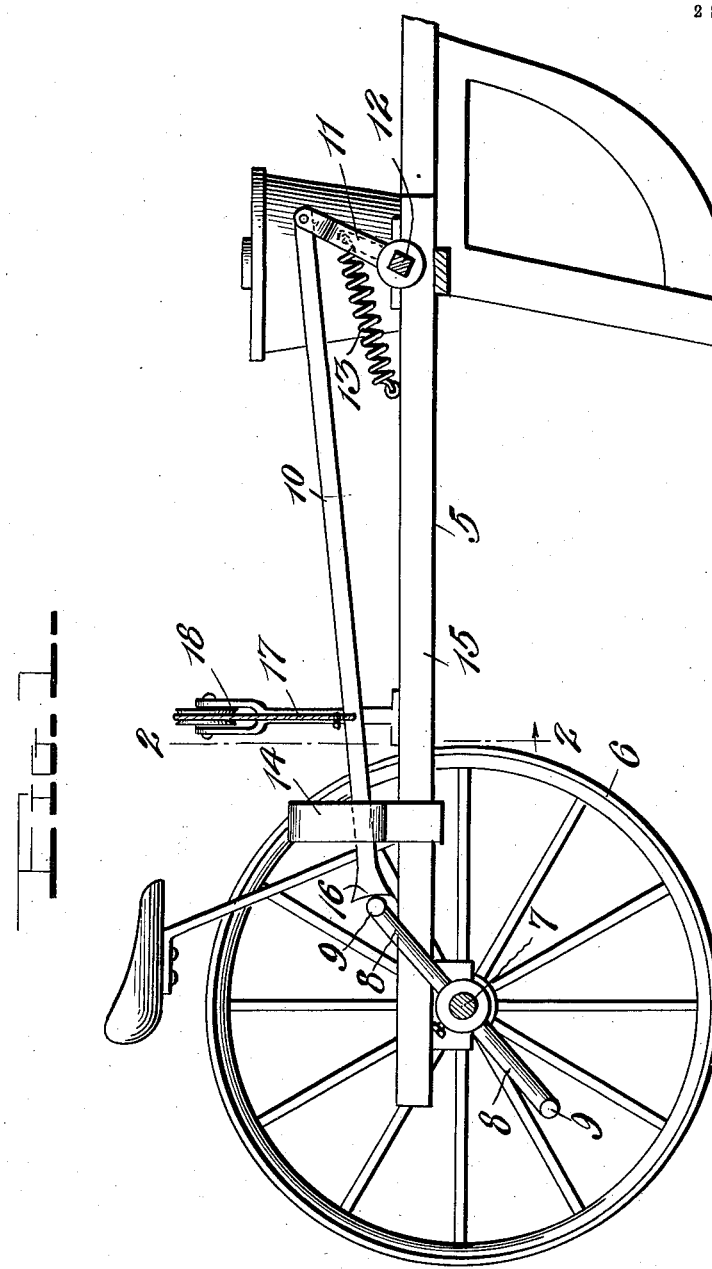

UNITED STATES PATENT OFFICE.

LAMBERT WHEELER, OF MOUNT VERNON, OHIO.

ATTACHMENT FOR PLANTING-MACHINES.

1,023,346.  Specification of Letters Patent.  Patented Apr. 16, 1912.

Application filed February 21, 1911. Serial No. 610,118.

*To all whom it may concern:*

Be it known that I, LAMBERT WHEELER, a citizen of the United States, residing at Mount Vernon, in the county of Knox and State of Ohio, have invented certain new and useful Improvements in Attachments for Planting-Machines, of which the following is a specification, reference being had to the accompanying drawings.

This invention relates to planter attachments and more particularly to a simple attachment which is primarily devised for use upon corn planters and machines of a similar character, the invention having for its primary object the elimination of the usual notched wire which is commonly employed for checking the rows.

The invention has for a further object the provision of a device which may be easily and quickly attached to planting machines of the present construction without requiring any change therein and which will intermittently actuate the seed dropping mechanisms as the machine moves forwardly over the field.

With the above and other objects in view, the invention consists of the novel features of construction and the combination and arrangement of parts hereinafter fully described and claimed, and illustrated in the accompanying drawings, in which—

Figure 1 is a side elevation of a planting machine illustrating the application of my attachment thereto; Fig. 2 is a section taken on the line 2—2 of Fig. 1; Fig. 3 is a detail perspective view of the pitman and the connection of the same to the seed driving shaft. Fig. 4 is a detail perspective view of the pitman engaging arm.

Referring in detail to the drawing 5 designates the frame of a planting machine of any approved construction which is mounted between the ground wheels 6. The wheel axle 7 to which the ground wheels are fixed has arranged upon one end thereof an arm 8 which extends upon opposite sides of the shaft and has its extremities bent at right angles as indicated at 9. The angularly disposed ends of this arm are adapted to co-act with the longitudinally movable pitman 10. One end of this pitman is pivotally connected to an arm 11 rigidly fixed to the shaft 12 which is mounted upon the frame of the machine and connects the seed dropping mechanisms. This shaft is normally held yieldingly against oscillation by means of the spring 13 which connects the same to one of the transverse frame bars.

The other end of the pitman 10 is movably mounted in the guide loop 14 connected to the upper end of the bar 15 which at its lower end is rigidly fixed to one of the longitudinal side bars of the frame 5. This end of the pitman is of greater width than the remaining portion thereof as indicated at 16, whereby, in each rotation of the frame-supporting wheel 6, the angular extremities of the arm 8 contact with the end of the pitman and cause the same to move in the guide to oscillate the seed dropping shaft 12 to a sufficient extent to properly actuate the dropping mechanisms and deposit the seed. After the end of the arm 8 passes below the attachment, the spring 13 immediately returns the seed dropping shaft to its normal position.

From the above it is believed that the construction and operation of my improved attachment will be readily understood. In order to discontinue the dropping of the seed when the machine is being turned, I provide the cable or rope 17 which is attached at one end of the attachment and passes over a pulley 18 mounted upon any convenient part of the frame of the machine. The other end of this rope or cable has a stirrup 19 attached thereto for engagement with the foot of the operator. It will thus be seen that the attachment may be readily elevated so that the ends of the frame 8 will not contact therewith, by simply placing the foot in the stirrup and forcing the same downward.

In operation, the seed are dropped upon each half revolution of the ground wheels. It will be obvious, however, that a greater number of arms 8 may be provided if desired. The device may be readily arranged upon any of the various makes of planting machines at small cost and as the attachment involves but few additional elements, the draft upon the horses or other draft animals is not materially increased. The attachment is also extremely durable and highly efficient in practical use.

Having thus described my invention what is claimed is:

1. The combination with a wheel supported frame and seed dropping mechanisms mounted thereon and including a shaft, of a pitman connected to said shaft to oscillate the same, the pitman extending rearwardly from said shaft, means movable by and with the wheels for intermittently engaging said pitman whereby to move the same forwardly and actuate said shaft, means tending to move the pitman rearwardly, and foot operated means connected to said pitman whereby the downward movement of the operator's foot may raise the pitman out of the path of the pitman engaging means.

2. The combination with a wheel supported frame and seed dropping mechanisms mounted thereon and including a shaft, of a pitman operatively connected at its front end to said shaft to oscillate the same, means movable by and with the wheels for intermittently engaging the pitman whereby to move the same in one direction to oscillate the shaft, a pulley supported by and above the frame, and a cable connected at one end to the pitman and extending upwardly and transversely over the pulley with its free end depending therefrom, and a stirrup connected to said free end of the cable, whereby the operator by pressing downwardly with his foot on the stirrup may raise the rear end of the pitman out of the path of movement of the pitman engaging means.

In testimony whereof I hereunto affix my signature in the presence of two witnesses.

LAMBERT WHEELER.

Witnesses:
L. S. BRADFIELD,
W. M. PAYNE.

---

Copies of this patent may be obtained for five cents each, by addressing the "Commissioner of Patents, Washington, D. C."